United States Patent [19]

Nelson

[11] Patent Number: 5,066,707

[45] Date of Patent: Nov. 19, 1991

[54] COMPOSITION

[75] Inventor: Linda H. Nelson, Evansville, Ind.

[73] Assignee: General Electric Company, Mt. Vernon, Ind.

[21] Appl. No.: 452,480

[22] Filed: Dec. 19, 1989

[51] Int. Cl.$^5$ ................................................ C08K 5/01
[52] U.S. Cl. ..................................... 524/490; 524/491; 524/560; 524/565; 524/575
[58] Field of Search ............... 524/490, 491, 565, 575, 524/481, 560

[56] References Cited

U.S. PATENT DOCUMENTS

| | | |
|---|---|---|
| 3,403,120 | 9/1968 | Ott et al. |
| 3,759,863 | 9/1973 | Czekay et al. ................. 525/84 |
| 3,947,367 | 3/1976 | Foelsch . |
| 4,174,325 | 11/1979 | Pischtschan . |
| 4,399,251 | 8/1983 | Lee ................................ 524/565 |
| 4,408,000 | 10/1983 | Lee ................................ 524/565 |
| 4,626,566 | 12/1986 | Miller et al. .................. 524/574 |
| 4,826,913 | 5/1989 | Nelson . |

FOREIGN PATENT DOCUMENTS 177096 9/1985 European Pat. Off. .

Primary Examiner—Joseph L. Schofer
Assistant Examiner—Mark Sweet
Attorney, Agent, or Firm—Martin B. Barancik

[57] ABSTRACT

In accordance with the invention there is a composition comprising a ABS or ABS type resin in admixture with a mold release effective amount of a fluid hydrogenated oligomer of an alpha-olefin.

7 Claims, No Drawings

COMPOSITION

BACKGROUND OF THE INVENTION

Useful articles from various thermoplastic resins have been prepared from molds for many years.

Injection molding provides a convenient way for preparing various articles from thermoplastic resins, particularly objects of a relatively intricate nature. In order to injection mold articles in an economic manner the mold resident cycle time should be kept to a minimum. This shorter cycle time provides a shorter resin heat period with consequently less thermal damage to the resin itself and/or less thermal promoted interaction between the resin and various additives present in the resin. In order to accomplish a release of the resin from the mold, various mold release agents have been found which provide for a release of the resin with lower ejection pressure. Such an agent should be chemically compatible with the resin as measured by the usual characteristics of the resin under normal conditions and heat treatments.

Acrylonitrile-butadiene-styrene resins, usually abbreviated as ABS resins, also have a similar problem. Previously ethylenediamine bisstearamide has been incorporated into ABS resins as a lubricant, see U.S. Pat. No. 3,947,367. A further additive which has been disclosed as having generally a lubricating action and utilized to help increase the moldability of ABS resin are the esters of monocarboxylic saturated aliphatic acids with polyvalent alcohols of high molecular weight, see U.S. Pat. No. 4,174,325 wherein pentaerythrityltetrastearate was employed. It also has been known to use in general mineral oils for the release of certain thermoplastics such as polycarbonate from molds. Such mineral oils are described in Japanese application numbers K53,22556; K79,16559; K72,41093; K80,84353 and GB patent number 2077742. Mineral oils are naturally occuring complex mixtures of hydrocarbons that are obtained from petroleum. Additionally 0.1 to 3.0 weight percent of a mineral oil has been employed to increase the impact strength and improve flowability of an ABS resin, see European Patent Application 177096. These mineral oils are (1) paraffinic in nature with straight or branched chains containing at least 20 carbon atoms, (2) naphthenic or relatively naphthenic—i.e., constituted at least prevailingly by saturated, monocyclic, of from 4 to 12 carbon atoms and polycyclic, of from 13 to 26 carbon atom hydrocarbons, or (3) the aromatic oils having a minimum molecular weight around 300. All these oils show a minimum flash point in closed cup, according to ASTM D 93, of 150° C. However, the resin compositions with the mineral oil are prepared by adding the mineral oil to the actual manufacturing process of the ABS resin. For example the oils are added during the endstage of the grafting reaction or before the coagulation of the latex to the grafted polymer. Therefore the resulting ABS resin composition does not appear to be a mere admixture of the ABS resin and the mineral oil. Rather the oils appear to be at least substantially intermingled during the actual manufacturing process of the ABS resin.

U.S. Pat. No. 3,759,863, incorporated within, discloses a four component composition of polyvinylchloride, a certain type of ABS, a dialkyltin mercaptide stabilizer and a lubricant which is described as essentially containing hydrocarbons with at least 16 carbon atoms. A mineral oil of hydrocarbons with 20 to 30 carbon atoms, having a boiling range of above 350° C. and a refraction index of $n_D^{20} = 1.4816$ are preferred.

U.S. Pat. No. 3,403,120 discloses as a lubricant for ABS a paraffinic, naphthenic or aromatic mineral oils preferably having a certain viscosity range. At least 3 wt.% of the lubricant should be used. The additive is added to the coagulum of the latex of the polymeric components, incorporation inside the anhydrous pellets or by admixing into the latex and then coagulating the latex.

In none of these publications is there an indication that the lubricant was functioning as a mold release agent.

Recently synthetic mineral oils derived from the oligomerization of alpha olefins followed by hydrogenation to remove unsaturation has provided surprising benefit in the area of mold release agents for various materials. Miller et al, U.S. Pat. No. 4,626,566 described and claims aromatic carbonate polymer compositions and admixture with a hydrogenated alpha olefin oligomer fluid. Additionally U.S. Pat. No. 4,826,913 discloses the use of such oligomer fluids as mold release effective agents for various other polymers including organic polyesters, poly(arylene oxide)s, poly(arylene sulfide)s, poly(etherimide)s and polysulfones. However to this date there has been no known admixture of these synthetic oligomers fluids with an ABS resin.

SUMMARY OF THE INVENTION

In accordance with the invention there is a composition comprising an ABS or ABS type resin in admixture with a mold release effective amount of a fluid hydrogenated oligomer of an alpha-olefin.

Another aspect of the invention that the admixture can occur with the already manufactured ABS or ABS type resin.

A further aspect of the invention is the absence or essential absence of polyvinyl chloride and/or a dialkyltin mercaptide stabilizer from the composition.

DETAILED DESCRIPTION OF THE INVENTION

The ABS composition or ABS type composition which is employed in this invention is the usual standard ABS compositions known throughout the industry. An ABS or ABS type composition comprises from (a) about 10 to 90 weight percent of a mixture of acrylonitrile and styrene or alpha-methyl styrene wherein the acrylonitrile is from about 10 to 50 weight percent of the reactant mixture and the styrene and/or alpha-methyl styrene is from about 50 to 90 weight percent of the reactant mixture and (b) about 90 to 10 weight percent of polybutadiene or polyisoprene, preferrably polybutadiene. Up to about 50 wt.% of the polybutdiene or polyisoprene can be replaced by the styrenic material. Of course, copolymers of acrylonitrile and styrene and/or alpha-methyl styrene are also present in the ABS type material. Additionally wherein acrylonitrile is used either some or all of the acrylonitrile can be replaced with methylmethacrylate. The preferred resins are acrylonitrile butadiene styrene (ABS) or methylmethacrylate butadene styrene (MBS). With respect to MBS a preferred configuration is coreshell. These resins may be made by any of the well known methods including suspension polymerization, bulk polymerization, or bulk suspension polymerization or other procedures which are known to prepare core shell polymers.

The hydrogenated alpha-olefin oligomer fluids useful in this invention are derived from the oligomerization of alpha olefins through a catalytic reaction followed by optional hydrogenation to remove residual unsaturation. Examples of such catalysis include: cationic catalysis, see J.A. Breenan, Ind. Eng. Chem. Prod. Res. Div. (1980) 19,2; Ziegler catalysis, see D.H. Antonsen et al, Ind. Eng. Chm. Prod. Res. Div. (1963), 2,224, or metathesis catalysis, see W.T. Nelson et al, Ind. Eng. Chem. Prod. Res. Div., (1983), 22, 178 and references therein. Methods of preparation are also disclosed in U.S. Pat. Nos. 4,282,392; 4,225,739; 4,319,065; 4,311,864; 4,334,113 and 4,409,415 and references therein.

The product of oligomerization/hydrogenation is a mineral oil with fluidity over a wide temperature range. The product generally is a mixture of oligomers of various degrees of polymerization, branching and isomerization depending on the nature of the catalyst and olefin used and any subsequent product fractionation such as by distillation. A product structure representative of this type of oligomerization is 9-methyl-11-n-octyl heneicosane. Normal alpha olefins of 6-12 carbon atoms are preferred for the preparation of synthetic fluids, with 1-decene being most common. The oligomers are generally separated into various mixtures of dimer, trimer, tetramer and pentamer to achieve varying degrees of volatility, viscosity and viscosity index. The preferred alpha-olefin oligomer fluids for this invention are those with a kinematic viscosity of approximately 2-10 cSt at 100° C. as determined by ASTM D445. Such oligomer fluids are commercially available from Emery Industries, and are known as Emery 3002, Emery 3004, Emery 3006 and Emery 3010. The approximate composition of these fluids, as determined by gas chromatography, is shown below.

|  | DIMER | TRIMER | TETRAMER | PENTAMER | AVG. # CARBONS |
|---|---|---|---|---|---|
| 3002 | 100% | — | — | — | 20 |
| 3004 | — | 89 | 11 | — | 31 |
| 3006 | — | 29 | 62 | 9 | 38 |

Alternatively, the Synfluids manufactured by Gulf Oil Corporation also may be used.

An effective mold releasing amount of the material of the invention is employed in the thermoplastic composition. An amount of material which reduces the amount of pressure needed to eject the article from the injection mold and obtain a substantially unblemished article in comparison to the pressure needed to eject the thermoplastic composition control is an effective mold releasing amount. In general effective amounts of the material are from about 0.25 to about 5.0 weight percent based on the quantity of ABS or ABS type resin present, preferably from about 0.5 to about 3.0 weight percent. A more preferred range is about 1.0 to about 2.5 weight percent.

The materials are preferably added to the resin after the ABS resin has been manufactured. That is, it should be added in the normal manner that the usual additives are added, for example blended with the previously manufactured ABS or ABS type resin in a Banbury mixer or actually added during the extrusion process wherein the ABS or ABS type resin is being pelletized. Although it is preferred to add the oligomer fluid during the dry mixing of the finished ABS or ABS type resin, it can also be added during the manufacturing process as, for example during the endstage of the grafting reaction or before the coagulation of the latex to the grafted polymer.

Below are examples of the invention. These examples are intended to illustrate and exemplify rather than narrow the inventive concept.

EXAMPLE 1

Blendex 101 an ABS resin with 24 wt.% acrylonitrile, 30 wt.% butadiene and 46 wt.% styrene was blended with 0.3 wt.% of a hindered phenol and 0.3 wt.% of a thioester. This was identified as control 1. The Blendex 101 is available from GE Plastics. To 100% Blendex 101 was added 0.3 wt.% of a hindered phenol and 2 wt.% ethylene bisstearamide (EBS), a known lubricant for ABS. This is identified in the table below as control 2. Finally, to Blendex 101 is added 0.3 wt.% of a hindered phosphite, 0.3 wt.% of a thioester and 2 wt.% of a synthetic hydrogenated alpha-olefin oligomer fluid identified as Emery 3004, available from Emery Chemical Company. The blending of the Emery 3004 occurred after the manufacturing of the Blendex 101 and was done in the extruder.

Mold release effectiveness was determined in an injection molding machine with a 4 ounce shot capacity. The part molded was a 3" by 3" center-gated box tool with a 1½" wall height and ⅛" thick walls. It had ejector pins at four corners with two of the pins being attached to strain gauge transducers for measuring the part ejection pressure. The mold was designed with very little draft so that the part would tend to stick to the core unless a mold release agent was used. Below are the results:

TABLE I

|  | Control 1 | Control 2 | Example 1 |
|---|---|---|---|
| Mold Release agent | 0.00 | 2 wt. % EBS | 2 wt. % Emery 3004 |
| Release Pressure psi | 1678 ± 44$^a$ | 1620 ± 63$^b$ | 1422 ± 83$^a$ |

$^a$average of nine tests
$^b$average of ten tests

As is readily observed from the data in the table the known lubricant ethylene bisstearamide (EBS) does not reduce the release pressure at all. However the use of the Emery 3004 hydrogenated oligomer fluid substantially reduced the release pressure for the ejected particle.

EXAMPLE 2

In order to be an effective mold release agent, the mold release material should be compatible with the resin, that is, there should be very little if any degradation of the resin and the usual physical properties of the resin should be significantly unchanged.

Below, Blendex 101 was blended with 0.3 wt.% of a hindered phenol and 0.3 wt.% of a thioester. The control had no further material, including mold release agent. To various portions of the Blendex 101 Control was added differing quantities of the Emery 3004 hydrogenated alpha-olefin oligomer fluid. The Notched Izod was measured at various temperatures after the part was molded at sequentially higher temperatures. Below are the results:

TABLE II

|  | Control | Wt. % 2% | Emery 3004 3% |
|---|---|---|---|
| N.I. 480° F. RT | 8.2 | 8.2 | 7.6 |
| 0° C. | 7.0 | 7.2 | 7.1 |
| −30° C. | 5.1 | 5.5 | 5.3 |
| 520° F. RT | 7.9 | 7.7 | 7.5 |
| 0° C. | 6.6 | 6.7 | 6.9 |
| 530° F. RT | 6.7 | 6.8 | 7.2 |
| 0° C. | 5.7 | 6.2 | 6.3 |
| 545° F. RT | 6.3 | 6.5 | 6.6 |
| 0° C. | 5.1 | 5.6 | 5.8 |

The above results of Table II demonstrate that the hydrogenated alpha-olefin oligomer fluid is compatible with the ABS resin as measured by Notched Izod impact strength over a span of increasing molding temperatures.

What is claimed is:

1. A composition comprising a resin of
   (a) about 10 to 90 weight percent of a mixture of acrylonitrile or methylmethacrylate and styrene or alpha-methyl styrene wherein the acrylonitrile is from about 10 to 50 weight percent of the reactant mixture and the styrene and/or alpha-methyl styrene is from about 50 to 90 weight percent of the reactant mixture and
   (b) about 90 to 10 weight percent of polybutadiene or polyisoprene wherein up to 50 weight of the polybutadiene or polyisoprene is replaceable by a styrene or alpha-methyl-styrene, in admixture with a mold release effective amount of a fluid hydrogenated oligomer of an alpha olefin with the proviso that polyvinylchoride is absent from the composition.

2. The composition in accordance with claim 1 wherein the mixing of the alpha olefin oligomer occurs with the already manufactured resin.

3. The composition in accordance with claim 1 wherein the resin is ABS.

4. The composition in accordance with claim 1 wherein the resin is MBS.

5. The composition in accordance with claim 1 wherein dialkyltin mercaptide is absent from the composition.

6. The composition in accordance with claim 1 wherein the hydrogenated oligomer of ann alpha olefin is present in amounts of from about 0.25 to about 5.0 weight percent of the resin.

7. Th composition in accordance with claim 3 wherein the mixing of the alpha olefin oligomer occurs with the already manufactured resin.

* * * * *